US005882625A

United States Patent [19]

Mac Dougall et al.

[11] Patent Number: 5,882,625
[45] Date of Patent: Mar. 16, 1999

[54] FAUJASITE ADSORBENTS WITH NONUNIFORM AL DISTRIBUTION

[75] Inventors: James Edward Mac Dougall, New Tripoli; Thomas Albert Braymer, Allentown; Charles Gardner Coe, Macungie; Thomas Richard Gaffney, Allentown; Brian Keith Peterson, Fogelsville, all of Pa.

[73] Assignee: Air Products and Chemicals, Inc., Allentown, Pa.

[21] Appl. No.: 908,868

[22] Filed: Aug. 8, 1997

[51] Int. Cl.⁶ ..................................................... C01B 39/22
[52] U.S. Cl. .................................. 423/700; 428/DIG. 21
[58] Field of Search ................................. 423/328.2, 700, 423/DIG. 21

[56] References Cited

U.S. PATENT DOCUMENTS

| H282 | 6/1987 | Edwards et al. . | |
|---|---|---|---|
| 2,882,244 | 4/1959 | Milton . | |
| 3,510,258 | 5/1970 | Hinden et al. | 423/DIG. 21 |
| 3,720,756 | 3/1973 | Schwochow et al. | 423/DIG. 21 |
| 4,416,805 | 11/1983 | Kostinko | 423/DIG. 21 |
| 4,859,217 | 8/1989 | Chao . | |
| 5,118,482 | 6/1992 | Narayama et al. . | |
| 5,441,557 | 8/1995 | Mullhaupt et al. . | |
| 5,464,467 | 11/1995 | Fitch et al. . | |
| 5,487,882 | 1/1996 | Hu et al. | 423/DIG. 21 |
| 5,554,208 | 9/1996 | Mullhaupt et al. . | |
| 5,616,170 | 4/1997 | Ojo et al. . | |

OTHER PUBLICATIONS

"High–Resolution Solid–State NMR of Silicates and Zeolites", G. Engelhardt, D. Michel, John Wiley & Sons, 1987, pp. 222–241. (No month).

Engelhardt (Z. Anorg. Allg. Chem. 1981, 482, pp. 49–64) (w/English translation). (No month).

Nature (1981, 292, 228–230). Ramdas et al. (No month).

Klinowski, *J. Chem Soc.* Faraday 2, 1982, 78, pp. 1025–1050. (No month).

(List continued on next page.)

*Primary Examiner*—Mark L. Bell
*Assistant Examiner*—David Sample
*Attorney, Agent, or Firm*—Geoffrey L. Chase

[57] ABSTRACT

A faujasite aluminosilicate with a Si/Al ratio in the range of 1.05 to 1.26 having an non-uniform aluminum distribution, synthesized by crystallizing the zeolite from a mixture of alkali metal aluminate and alkali metal silicate wherein the mixture has an alkali metal oxide to silica ratio of at least 1.6 and a water to alkali metal oxide ratio of at least 37. The X-zeolite has utility as a gas separation adsorbent such as separating oxygen from nitrogen in air.

10 Claims, 2 Drawing Sheets

OTHER PUBLICATIONS

Forano, C.; Slade, T. C. T.; Andersen, E. Krogh; Andersen, I. G. Krogh; Prince, E. *J. Solid State Chem.* 1989, 82, pp. 95–102. (No month).

Melchior, M. T.; Vaughan, D. E. W.; Pictroski, C.F. *Journal of Physical Chemistry*, 1995, 99, pp. 6128–6144. (No month).

Vega A.J. *Journal of Physical Chemistry*, 1996, 100, pp. 833–836. (No month).

Smith, J.V. Advances in Chemistry Series, vol. 101, Molecular Sieve Zeolites–I, American Chemical Society Washington, D.C. 1971, pp. 171–200. (No month).

"Characterization of the Silicon–Aluminum Distribution in Synthetic Faujasites by High–Resolution Solid–State Si NMR,", Melchior, M. T., et al.,*J. Am. Chem. Soc.* 1982, 104, pp. 4859–4864 (No month).

"The Compositional Dependence of Si Chemical Shifts in Faujasite Framework Zeolites" 1989 *Elsevier Science Publishers B. V.*, Amsterdam, pp. 805–815. Melchior (No month).

"A Statistical Approach to the Interpretation of Silicon–29 NMR of Zeolites", Vega, A. J., 1983 *American Chemical Society*, pp. 217–230. (No month).

"Powder Neutron Diffraction and Si MAS NMR Studies of Siliceous Zeolite–Y," Hriljac, J.A., et al., *Journal of Solid State Chemistry* 106, pp. 66–72 (1993). (No month).

"Crystal Structures: A Working Approach", Megaw, Helen D., 1973, *W. B. Saunders Company*, pp. 282–285. (No month).

"Silicon and Aluminum Ordering of Zeolites: Interpretation of Silicon–29 NMR Data for Faujasite and ZK4," 1983 *American Chemical Society*, 15, pp. 243–265. Melchior (No month).

"Atlas of Zeolite Structure Types" Merer W. M., Olsen, D. H. Third Revised Edition, *Butterworth Herneman*, 1992. Linde Type L, LTL, pp. 124–125 (No month).

100
FAUJASITE ADSORBENTS WITH NONUNIFORM AL DISTRIBUTION

BACKGROUND OF THE INVENTION

The challenge facing non-cryogenic gas separation is to have adsorbents with higher capacity and selectivity. It is well established that selective gas adsorption occurs at cation ion sites within crystalline microporous solids (ie. zeolites), where a more strongly adsorbed component of a gas mixture will physically adsorb, leaving a gas stream enriched in the less strongly adsorbed component. An example of this is the equilibrium controlled adsorption of $N_2$ from air to give a stream enriched in $O_2$. It is known that zeolites are useful for this type of separation, and it is well known that zeolites with high charge density cations, eg. Ca or Li are effective for this separation. The factor limiting the use of zeolites for this application is that in zeolites (crystalline aluminosilicates) a limiting amount of cations is reached when these zeolites become Al saturated. This is defined at a Si/Al ratio of 1.0. If there were ways of modifying the framework array of aluminum to add more cations in accessible areas, these materials could have greater utility for gas separations.

Enhancements in $N_2$ adsorption and $N_2/O_2$ selectivity for gas separations applications using Li X-zeolite adsorbents are well known. Chao in U.S. Pat. No. 4,859,217 describes this enhancement when the $SiO_2/Al_2O_3$ ratio of an X-type zeolite is between 2.0 and 3.0 (Si/Al ratios of 1.0 to 1.5) and when 88 percent or more of the Li cations are associated with $AlO_2$ tetrahedral units.

One skilled in the art would recognize that the X-zeolite adsorbents of Chao have the faujasite structure and would have a solid state $^{29}$Si magic angle spinning NMR spectrum consistent with that shown in Engelhardt and Michel, "High-Resolution Solid-State NMR of Silicates and Zeolites, John Wiley & Sons, 1987, pp 222–241.

The aluminum rich end member of this series, commonly known as low silica X (LSX), with a $SiO_2/Al_2O_3$ ratio of 2.0, is well known to have a fixed and alternating arrangement of Si and Al tetrahedral framework atoms, leading to a uniform distribution of Al and Si throughout the crystal. This composition also has the maximum number of Li cations per unit cell and has the best adsorption properties found so far for a gas separation application, such as $O_2$ VSA.

Mullhaupt in U.S. Pat. No. 5,441,557, and its divisional U.S. Pat. No. 5,554,208, show that when the cation and Al framework atoms are arranged in a symmetric (uniform) fashion throughout the entire crystal of zeolite the adsorption properties are maximized. According to Mullhaupt, semi-symmetric or asymmetric (non-uniform) Al or cation distributions throughout a zeolite crystal lead to inferior adsorption properties in this class of materials. According to this prior art, arrangements of Al atoms in a faujasite structure are a result of the Si/Al ratio of the particular composition. This notion of a fixed arrangement, would dictate both cation content and placement within a unit cell of the crystal.

However, It is possible to have solid state isomers of materials with the same bulk composition. These are defined as the aristotype and hettotypes according to Megaw (Helen D. Megaw *Crystal Structures: A Working Approach*, W. B. Saunders Company, Philadelphia, London, Toronto, 1973, pp. 282–285). The aristotype of faujasite is the silica polymorph, the all silica material, defined as ZDDAY by Hriljac et. al. (Hriljac, J. A.; Eddy, M. M.; Cheetham, A. K.; Donohue, J. A.; Ray, G. J. *Journal of Solid State Chemistry* 1993, 106, pp. 66–72). All compositions with the faujasite structure that contain both Si and Al in the framework are classified as hettotypes of this aristotype. Hettotypes are defined as having lower symmetry which are a result of various modifications of the aristotype, such as having different elements (or arrangements of elements) with a similar unit cell. Since Si and Al have very similar X-ray scattering characteristics, the X-ray diffraction (XRD) patterns of these various hettotypes are similar.

The X-type zeolites of this invention are hettotypes of the same framework structure found by Milton over 30 years ago. Milton's U.S. Pat. No. 2,882,244 defines zeolite X based on composition and diffraction. The X-type zeolites of the present invention are within the bulk compositional range ($SiO_2/Al_2O_3$=2–3) of Milton and have similar XRD patterns. For a given hettotype, with a fixed composition, numerous variations of the arrangement of Si and Al are possible throughout the crystal and will not significantly alter the XRD pattern to any great extent.

One analytical technique to measure these differences is $^{29}$Si NMR. Based on the integrated intensities of the Si(OAl) and Si(1Al) resonances in the solid state magic angle spinning (MAS) $^{29}$Si NMR pattern, we can divide the hettotypes for a given composition of X-type zeolites into two subsets. Type 1 hettotypes of faujasite (referred to hereafter as Type 1) are those in which the integrated intensity of the Si(1Al) resonance is greater than the integrated intensity of the Si(OAl) resonance, whereas Type 2 hettotypes (referred to hereafter as Type 2) of faujasite are those in which the integrated intensity of the Si(1Al) resonance is less than the integrated intensity of the Si(OAl) resonance. These differences are a result of differing arrangements of Al and Si throughout the crystal, at a fixed Si/Al ratio. Using the integrated intensities of the NMR spectrum, we can show that X-type zeolites which are defined as Type 2 hettotypes of faujasite have more Si framework atoms with 4 Si next nearest neighbors than Si framework atoms with 3 Si next nearest neighbors and 1 Al next nearest neighbor. This is a consequence of the NMR spectrum described above.

We classify the X-type zeolites of Milton and subsequently Chao, since Chao describes his materials as being prepared by the methods of Milton, with Si/Al ratios between 1.0 and 1.25 as being Type 1 hettotypes of faujasite. This means that these materials at a given composition in this range have a particular type of Al distribution, where there are typically not Al-rich regions within the crystal, but rather a homogeneous distribution of Al throughout. Surveys of the NMR literature are abundant with this hettotype of faujasite. These will be discussed shortly.

In Engelhardt (Z. Anorg. Alig. Chem. 1981, 482, pp 49–64), Table 1 on page 50 shows the peak intensities for an X-type zeolite having a Si/Al ratio of 1.18. In this case the peak intensity (height) for the Si(OAl) peak is higher than the Si(1Al) peak; however the integrated intensities give the relative number of Si atoms in a particular environment. This is discussed later (page 56, in the paragraph starting with Si/Al=1.18). He describes the integrated intensities as being 63.5: 23.1: 5.8: 3.8: 3.8. This would give equal numbers of Si(OAl) and Si(1Al) which is outside the definition of Type 2 hettotypes of faujasite, since it gives an equal number of Si(OAl) and Si(1Al) species in the crystals. This further adds support for multiple ways of arranging the Si and Al on the faujasite topology.

Klinowski in Nature (1981, 292, 228–230.) clearly states that his 1.19 material has only two peaks, the Si(4Al) and the Si(3Al) with amounts of 18.6 and 7.4 respectively (based on 24 T atoms per sodalite cage). These amounts of Si(4Al) and Si(3Al) are inconsistent with a Si/Al ratio of 1.19, given these amounts the Si/Al ratio would be 1.07. Discussion in the text indicates that they were unable to observe an Si(OAl) peak, but expect it to have intensity of 2.

Klinowski, J. Chem Soc. Faraday 2,1982, 78, pp 1025–1050, lists normalized peak intensities. However, since his bulk analysis value and the NMR value do not match, this can not be considered a valid representation of a Type 2 hettotype. He further goes on to model these data suggesting that either there should be no Si(2 and 1Al), or later in the discussion that there should be no Si(OAl). Considering all this taken together it is unreasonable to call this an example of a Type 2 hettotype.

Neither Milton nor Chao show NMR data; however, if one of reasonable skill uses the preparative methods described by Milton (as Chao stated was the route to his adsorbents) one makes Type 1 hettotype faujasite with the previously mentioned characteristic NMR patterns. Examples are cited below to illustrate this, and correlate the gas adsorption properties of subsequently ion exchanged materials.

Contrary to the prior art, the present invention has demonstrated that X-zeolites having silica rich regions within the crystal, provide an unexpected enhancement in gas separations, as will be set forth in greater detail below.

BRIEF SUMMARY OF THE INVENTION

The present invention is an aluminosilicate zeolite having the faujasite structure with a Si/Al ratio in the range of approximately 1.05 to 1.26 and where the number of silicon atoms with four next nearest neighbor silicon atoms is greater than the number of silicon atoms with three next nearest neighbor silicon atoms and one next nearest neighbor aluminum atom and there are β-cages which contain 12 aluminum atoms and there are β-cages which contain 10 or less aluminum atoms in said zeolite. Faujasite zeolites with these characteristic properties are defined as Type 2 hettotypes.

Preferably, the $^{29}$Si nuclear magnetic resonance spectrum of said zeolite has a Si(OAl) peak of greater area than its Si(1Al) peak.

More preferably, the Si/Al ratio is approximately 1.15 to 1.20.

Preferably, the zeolite is cation exchanged with lithium.

More preferably, the lithium is exchanged to replace at least 80% of exchangeable cations in the zeolite.

The present invention is also a process of synthesizing an aluminosilicate zeolite having a faujasite structure with a Si/Al ratio in the range of approximately 1.05 to 1.26 and where the number of silicon atoms with four next nearest neighbor silicon atoms is greater than the number of silicon atoms with three next nearest neighbor silicon atoms and one next nearest neighbor aluminum atom, comprising crystallizing the zeolite from a mixture of alkali metal aluminate and alkali metal silicate wherein the mixture has an alkali metal oxide to silica ratio of at least 1.6, and the water to alkali metal oxide ratio is at least 37.

Preferably, the alkali metal aluminate is sodium aluminate.

Preferably, the alkali metal silicate is sodium metasilicate.

Preferably, the zeolite is cation exchanged with lithium cations to replace at least 80% of the exchangeable cations in the zeolite.

In a preferred embodiment, the present invention is a process of synthesizing an aluminosilicate zeolite having the faujasite structure with a Si/Al ratio in the range of approximately 1.05 to 1.26 and where the number of silicon atoms with four next nearest neighbor silicon atoms is greater than the number of silicon atoms with three next nearest neighbor silicon atoms and one next nearest neighbor aluminum atom and there are β-cages which contain 12 aluminum atoms and there are β-cages which contain 10 or less aluminum atoms in said zeolite, comprising mixing an aqueous solution of sodium aluminate and an aqueous solution of sodium metasilicate in a ratio of 1:3 to 1:10 in an aqueous medium wherein the resulting mixture has an alkali metal oxide to silica ratio of at least 1.6, and the water to alkali metal oxide ratio is at least 37, and crystallizing the mixture at elevated temperature and recovering the zeolite.

The present invention is also a method of separating a more strongly adsorbed gas specie from a less strongly adsorbed gas specie in a mixture of the more strongly adsorbed gas specie and the less -strongly adsorbed gas specie, comprising contacting the mixture at elevated pressure with an aluminosilicate zeolite having a faujasite structure with a Si/Al ratio in the range of approximately 1.05 to 1.26 and where the number of silicon atoms with four next nearest neighbor silicon atoms is greater than the number of silicon atoms with three next nearest neighbor silicon atoms and one next nearest neighbor aluminum atom and there are β-cages which contain 12 aluminum atoms and there are β-cages which contain 10 or less aluminum atoms in said zeolite, and adsorbing the more strongly adsorbed gas specie on the X-zeolite.

Preferably, the method comprising the steps of:

a) contacting the mixture with the zeolite at an elevated pressure and adsorbing the more strongly adsorbed specie on the zeolite while allowing the less strongly adsorbed specie to be recovered as an unadsorbed product;

b) terminating contact of the mixture on the zeolite and reducing the pressure on the zeolite to desorb the more strongly adsorbed gas specie;

c) repressurizing the zeolite with the unadsorbed product; and d) repeating steps a)–c) to provide a continuous process.

Preferably, the more strongly adsorbed gas specie is nitrogen and the less strongly adsorbed gas specie is oxygen.

Preferably, the mixture is air.

Preferably, the zeolite is contained in a plurality of parallel connected adsorption vessels and each vessel performs the steps so that when at least one vessel is performing step a), at least one other vessel is performing steps b) and/or c).

Preferably, the plurality of vessels is two.

Preferably, between step a) and step b), one vessel pressure equalizes with the other vessel.

DETAILED DESCRIPTION OF THE INVENTION

Figure 1A:
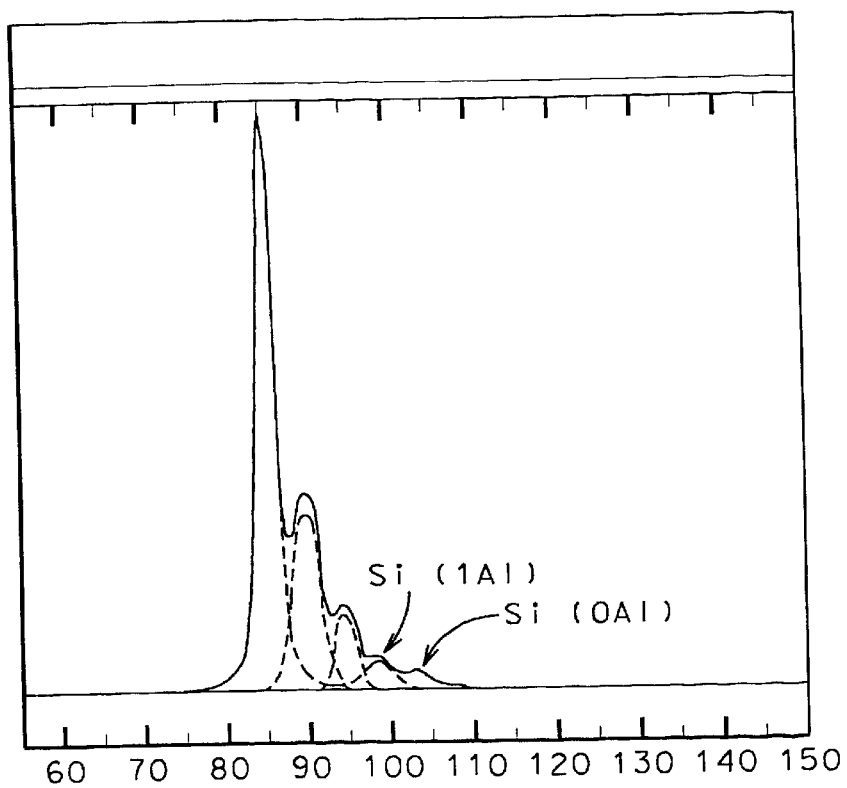
FIG. 1A is a $^{29}$Si MAS NMR spectrum of an X-zeolite being typical for a Type 1 hettotype of faujasite.

The present invention relates to aluminosilicate faujasite zeolites with high Al content ($1.05<Si/Al \leq 1.26$) where the Al tetrahedral framework atoms are distributed in such a way as to give a region or regions within the structure enriched in silica relative to the bulk composition. This enrichment in silica can be measured using solid state $^{29}Si$ MAS (magic angle spinning) NMR spectroscopy, as noted above. Correspondingly another region of the structure must be enriched in Al tetrahedral atoms, with Si/Al ratio approaching 1. In the Al enriched portion of the structure, SIII cation positions, as defined by Smith (Smith, J. V. Advances in Chemistry Series, volume 101, Molecular Sieve Zeolites-I, American Chemical Society, Washington, D.C. 1971, pp 171–200.) will have a higher population of Li cations than the Si enriched portions of the structure. Since Li cations in SIII are most effective at sorbing $N_2$, the nitrogen capacity and the $N_2/O_2$ selectivity are increased. In contrast to increasing the SIII occupancy with Li by using more aluminous framework compositions, these gains are realized without the need for more Li in the structure. For this unique set of materials, the result is to surprisingly enhance the $N_2$ capacity without effecting the $O_2$ capacity, thus resulting in an increase in selectivity for application to air separation using $O_2$ VSA technology. The underlying structural component ie. The Al distribution consistent with a Type 2 hettotype, will affect other gas separations as well and in general enhance the selectivity for the more strongly interacting gas from a gas mixture.

The particular Al distribution defined as Type 2 possesses a greater number of silicon atoms with four next nearest neighbor silicon atoms than the number of silicon atoms with three next nearest neighbor silicon atoms and one next nearest neighbor aluminum atom.

A schematic representation of Si with 0 and 1 next nearest neighbor Al tetrahedral atom is depicted below:

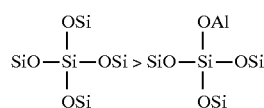

It should be understood that this depiction is an isolated view of one tetrahedral structure in an overall zeolitic crystal where each of the outlying silicon atoms and aluminum atoms have their valences fully accommodated with further bonds consistent with a faujasite aluminosilicate zeolitic structure.

A larger number of Si(OAl) species implies that the zeolite contains more silicon-rich and more aluminum-rich regions for length scales larger than a single tetrahedron. In particular, the distribution of numbers of aluminum atoms in a β-cage is broader for the present invention Type 2 hettotypes, than the Type 1 hettotypes of the prior art. Mulihaupt claims that materials with the same, or nearly the same, numbers of aluminum atoms in each β-cage are preferred. We found the opposite; it is more preferable to have a broad distribution, including even a bi-modal distribution, of numbers of aluminum atoms in β-cages. The broad distribution is equivalent to having a segregation into silicon-rich and aluminum-rich domains with a characteristic length scale as large or larger than the size of a β-cage. We have determined from $^{29}Si$ NMR measurements that the Type 2 materials have β-cages which contain 12 aluminum atoms and β-cages which contain 10 or less aluminum atoms in said zeolite.

As described by Mulihaupt, a β-cage is a truncated octahedral array of tetrahedrally coordinated Si or Al atoms, each bound to 4 oxygen atoms. Each β-cage in a zeolite contains 24 Si or up to 12 Al atoms in place of Si. The β-cages are attached to one another by groups of 6 oxygen atoms. The resulting β-cage networks define three-dimensional microporous systems of roughly spherical volumes called supercages. The latter are larger than the β-cages and are accessible through openings formed by rings of twelve oxygen atoms. Adsorption of gases too large to enter the β cages in pressure swing adsorption occurs in the supercages.

Figure 1B:
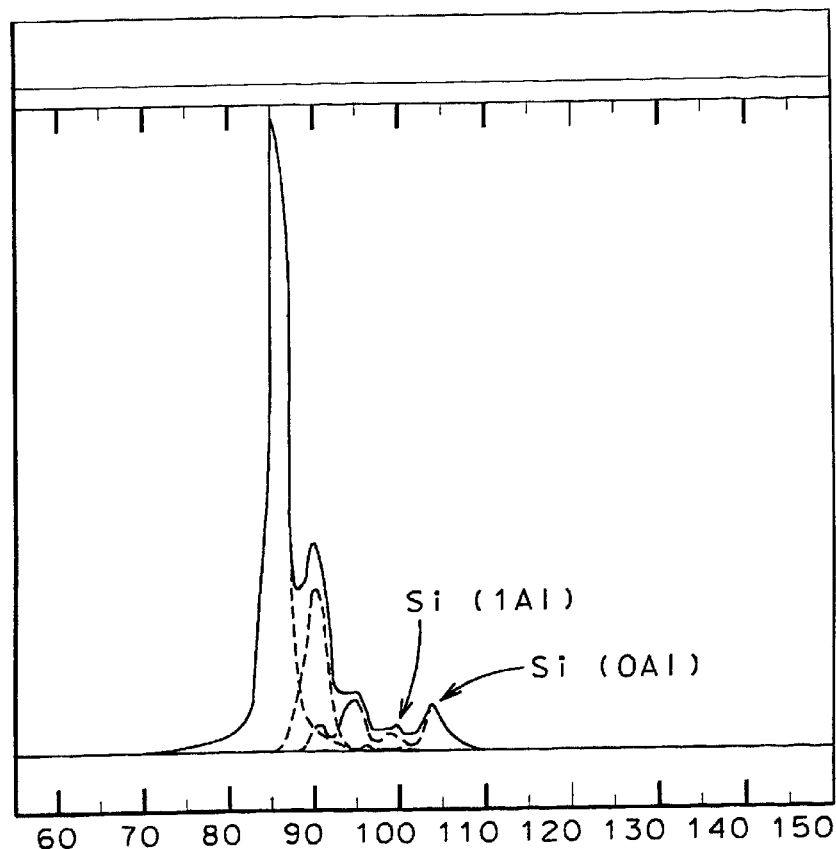
FIG. 1B is a $^{29}$Si MAS NMR spectrum of an X-zeolite being typical for a Type 2 hettotype of faujasite.

As stated above, one way of estimating the relative amounts of the various Si atoms with differing numbers of Al next nearest neighbors is to use $^{29}Si$ NMR spectroscopy. Engelhardt and Michel in their book (High-Resolution Solid-State NMR of Silicates and Zeolites, G. Engelhardt, D. Michel, John Wiley & Sons, 1987, pp 218–238.) describe this process, and show examples for prior art faujasites with varying Si/Al ratio. These prior art materials and additional examples prepared in support of this application set forth in the following examples show 29Si NMR spectra where the Si(1Al) peak area is greater than the Si(0Al) peak area as shown in FIG. 1A. These materials are defined to have Al distributions consistent with Type 1 hettotypes of faujasite. In FIG. 1B in contrast, the faulasite aluminosilicate zeolites of the present invention have a Si(1Al) peak area smaller than the Si(0Al) peak area, and these materials are defined to have Al distributions consistent with Type 2 hettotypes of faujasite.

To understand why such a change in Al distribution can have a positive effect on adsorption properties, some understanding of cation siting in faujasite must be developed and this information related to $N_2$ and $O_2$ adsorption in the single component mode. Also one must understand how these affect $N_2/O_2$ selectivity in a binary mode which is how these materials would be used for adsorbents in $O_2$ VSA applications. The same principles are valid for removing a more strongly adsorbed component from a stream containing other less strongly adsorbed components.

First structural considerations must be understood. In the faujasite structure, there are three (3) common cation sites, as defined by Smith. The first (SI and SI') are associated with the double six ring unit, which connects the sodalite cages of the structure. For the purposes of gas separation applications any cation on this site is inaccessible to most permanent gases including $N_2$. The second cation site (SII) is on the face of the six ring pointing into the supercage of the structure. Depending on the exact location and type of cation, this site is either accessible and effective for cation-gas interaction or accessible, but ineffective. The distinction is as follows. Accessible and effective cations are those whose size is sufficiently large so that the cation protrudes into the supercage allowing a gas molecule to approach and interact. Examples of accessible and effective cations in the SII position of faujasite are Ca and Na. Cations which are accessible, but ineffective, are those which can not interact with gas molecules, either because of electronic shielding of neighboring oxygen anions of the framework or steric constraints. An example of this type of accessible, but ineffective cation on SII is Li. The final important site for purposes of this discussion is SIII, which is located on the twelve (12) ring window of the supercage and associated with oxygen anions of the four rings, which make up the β-cage structure. For gas separations involving small monovalent cations (eg. Li), this is the site which is most effective for selective adsorption of a more strongly adsorbed component, ie. $N_2$ out of an air feed stream. Structural investigations along with measurements of single component gas capacities and binary selectivity as a function of cation content and framework Si/Al ratio were required to develop a model which allows one to understand the behavior of Aluminum rich faujasites with respect to gas adsorption, and the importance of Al distribution and cation siting on the adsorption properties of weakly interacting gases.

The materials of the present invention do have the faujasite structure as determined by X-ray powder diffraction. The $^{29}Si$ magic angle spinning NMR spectrum of these materials is different from X-zeolite adsorbents of the prior art. Surveys of faujasite type materials using $^{29}Si$ NMR by Melchior and Vega (Melchior, M. T.; Vaughan, D. E. W.; Pictroski, C. F. *Journal of Physical Chemistry*, 1995, 99, pp 6128–6144. Vega, A. J. *Journal of Physical Chemistry*, 1996, 100, pp 833–836.) describe what possible mechanisms give rise to arrangements of Al and Si within faujasite crystals. These analyses clearly show the kind of behavior observed for prior art X-type adsorbents. The materials of the present invention are unlike those in several respects.

Initially, the $^{29}Si$ NMR spectra shown in FIGS. 1A and B show a comparison of a typical X-zeolite adsorbent prepared by prior art methods described in Example 7 below and a typical material of the present invention described in Example 8 below. The peak format in the following tables.

TABLE 1

FIG. 1A
CALCULATED RESULTS

| Si(nAl) n = 0 – 4 | Area Percent | Peak Position |
|---|---|---|
| 4 | 60.18 | −84.904 |
| 3 | 24.85 | −89.536 |
| 2 | 7.68 | −94.338 |
| 1 | 4.26 | −98.165 |
| 0 | 3.02 | −103.3 |

| Si/Al Ratio 1.1944 | | |
|---|---|---|

TABLE 2

FIG. 1B
CALCULATED RESULTS

| Si(nAl) n = 0 – 4 | Area Percent | Peak Position |
|---|---|---|
| 4 | 62.88 | −85.246 |
| 3 | 20.04 | −89.664 |
| 2 | 5.76 | −94.581 |
| 1 | 3.34 | −99.183 |
| 0 | 5.72 | −104 |

| Si/Al Ratio 1.1974 | | |
|---|---|---|

Using solid state $^{29}Si$ NMR data, it is possible to determine the relative amount of silicon in each of the five chemically distinct environments, Si(nAl), where n denotes the number of aluminum atoms connected directly through oxygen to silicon, (ie., nearest neighbors) and can be 0–4. The enhancement in the Si(0Al) resonance seen in FIG. 1B indicates more Si framework atoms surrounded by only Si atoms in the nearest neighbor shell. These portions of the framework, since they contain no Al framework atoms would have no cations associated with them. By finding these regions in a material with high Al content by this analytical technique, it is understood that these adsorbents have an Al distribution defined as a Type 2 hettotype of faujasite.

Figure 2:
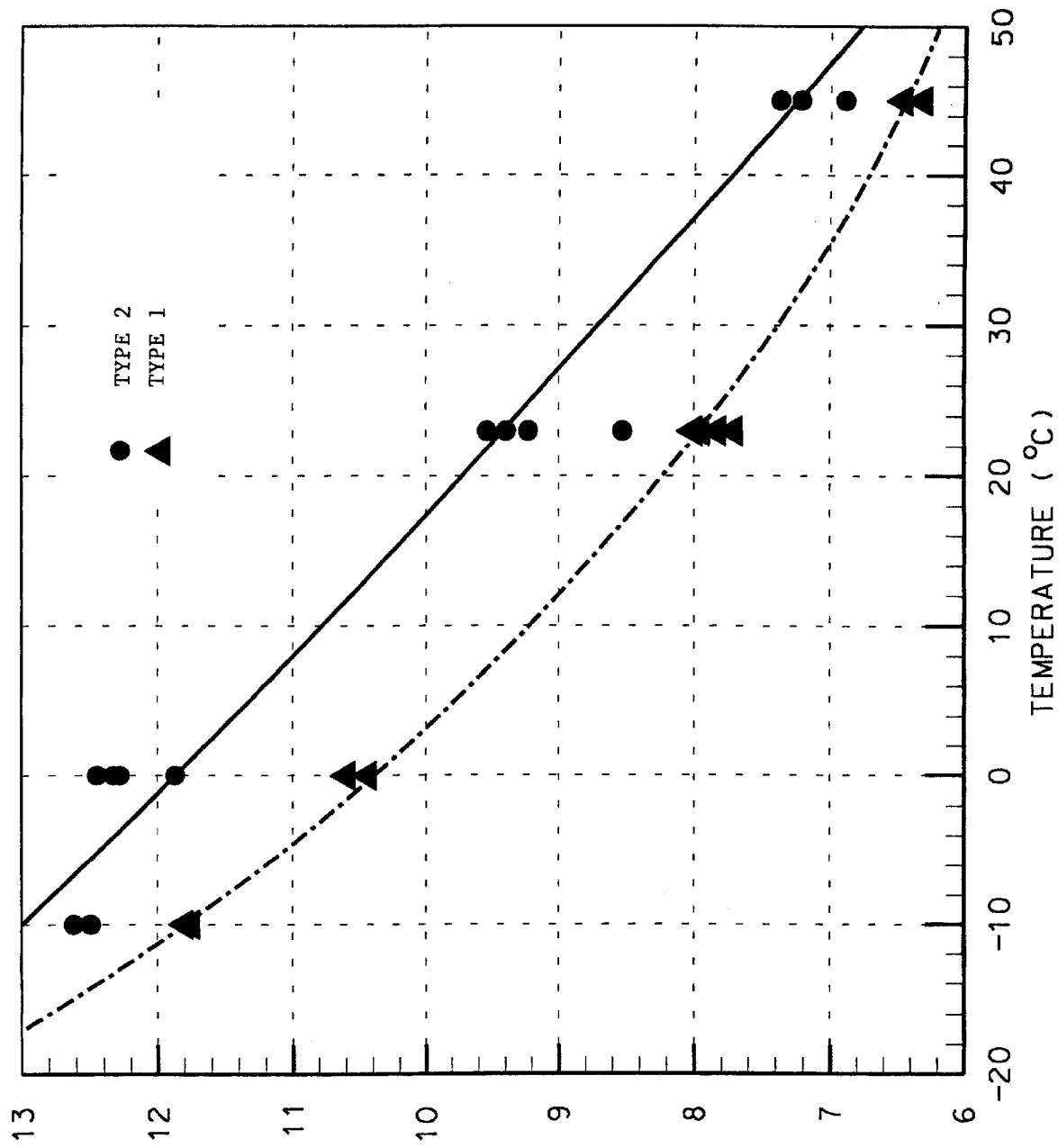
FIG. 2 is a graph of measured binary selectivity (at 1 atmosphere and 21.5% $O_2$) versus temperature for a Type 2 hettotype of the present invention and a Type 1 hettotype of faujasite of the prior art, having the same Si/Al ratio and Li cation content.

Another obvious difference is observed in the adsorption properties of these Type 2 adsorbents. At a given Li content determined from bulk analysis the adsorption capacities for $N_2$ and the binary selectivity of $N_2/O_2$ are greater for the current adsorbents with the Type 2 Al distribution compared to those prepared by the prior art methods, as indicated in FIG. 2 showing the comparison of two hettotypes of faujasite which were exchanged into the Li form and tested for air separation properties as described in Examples 7 and 8.

Using binary mixtures of nitrogen and oxygen, the adsorption capacities on activated adsorbents were measured using a closed volumetric system equipped with a pressure transducer. Binary gas mixtures of nitrogen and oxygen of known composition and pressure were circulated over the adsorbent bed in a closed loop until equilibrium is established. The sample loop and adsorbent bed were maintained at constant temperature using an external temperature bath. Once equilibrium was achieved the final pressure and composition were determined. All gas analyses were done using a GC containing a 5A molecular sieve column equipped with a thermal conductivity detector which was calibrated using five gas standards of relevant composition. Given the initial and final compositions and pressures the amount adsorbed is calculated directly from the mass balance in the system. The gas phase densities were calculated by the virial equation, which is accurate to better than 0.1% for the conditions used. Based on reproducibility studies the pooled standard deviation over the range of conditions measured for samples having similar selectivities was found to be 0.17 meaning that for any single measurement the error at 95% confidence is less than 4%.

Investigations in the present invention resulted in the following model which explains the improvements demonstrated in the present invention. Consider Li X (Si/Al=1.25), this material has about 85 Al tetrahedral atoms per unit cell in the framework and requires an equal number of Li cations to maintain charge neutrality. Assume that the Al atoms are uniformly distributed throughout the lattice, and that because of Coulombic interactions the Li cations are in close proximity to the oxygen anions associated with the Al atoms in the lattice. The first 32 Li cations will site on SI' in the β-cage, since it is well known this is the most thermodynamically favored site. The next 32 Li cations will site on SII, again well known from thermodynamic considerations. The final 21 cations will occupy SIII since this site is the next most favorable. These are confirmed by the crystal structure of Forano (Forano, C.; Slade, T. C. T.; Andersen, E. Krogh; Andersen, I. G. Krogh; Prince, E. J. *Solid State Chem.* 1989, 82, pp 95–102.), where the fractional occupancy factors for SI' and SII are nearly 1. As described above, the 32 Li cations on SI' are not accessible to gas and thus contribute little or nothing to adsorption properties of this adsorbent. The 32 Li cations on SII are, according to this model, accessible but ineffective for gas adsorption, again not contributing a significant amount to gas adsorption. The final 21 Li cations then are responsible for the intrinsic adsorption properties for this adsorbent. Only then with this model can one recognize that to improve the adsorption properties, it is necessary to increase the number of Li cations on SIII.

One way to accomplish this would be to add more Al framework atoms into the lattice requiring more Li cations to maintain charge neutrality. An example of this is going from Li X to Li LSX which increases the number of tetrahedral Al atoms from 85 to 96, and requires an equal number of Li cations. It is known that the intrinsic adsorption properties of Li LSX are superior to Li X and thus yield improvements in the utility of this adsorbent for gas separation applications, in for example an $O_2$ VSA process (Chao U.S. Pat. No. 4,859,217).

Another way to increase the number of Li cations on site SIII would be, in Li X for example, to move some of the Al tetrahedral atoms along with their Li cations into a location which caused the Li cations to move from site SI' or SII to SIII positions. This would have the effect of increasing the number of Al tetrahedral atoms in one region of the structure, thus leaving the region of the lattice that Al was removed from enriched in Si tetrahedral atoms. At the β-cage level, such an asymmetric segregation would produce some β-cages with more than the average number of Al-atoms and some β-cages with less than the average number of Al-atoms. According to Mulihaupt, such adsorbents would have inferior adsorption properties.

This model can be quantitatively evaluated as follows. Table 3 lists the measured $N_2$ capacities at 1 atmosphere, 23° C. for three adsorbents: Li LSX, the pure silica polymorph of faujasite (which has essentially no Al or Li cations) and Li X (Si/Al=1.22). If one made a physical mixture of Li LSX and the silica polymorph of faujasite which would contain on a weight basis the same amount of Si, Al and Li as Li X (1.22), and scale the adsorption properties of this mixture on the basis of a weight fraction of the pure components, one could estimate the $N_2$ capacity of that mixture and compare it to Li X (1.22). As listed in Table 3, the mixture would consist of about 90% Li LSX and about 10% of the silica polymorph of faujasite. The $N_2$ capacity of this mixture would have almost a 30% increase compared to Li X (1.22). This extreme (boundary value) example illustrates the concept of how Type 2 Al distribution enhances adsorption.

TABLE 3

Example of a physical mixture

| Example Si/Al ratio | Measured $N_2$ Capacity | Mixture percentage | Calculated contribution to $N_2$ Capacity | Increase in $N_2$ Capacity |
| --- | --- | --- | --- | --- |
| 1.00 | 33.60 | 90.11 | 30.28 | — |
| 200 | 2.10 | 9.89 | 0.21 | — |
| 1.22 | 23.60 | 100.00 | 30.48 | 29.17% |

It is well known that faujasites (X and Y) zeolites can be prepared over a wide range of compositions, typically from Si/Al ratios of 1:1 to about 3:1. Various conditions and reagents are used to obtain this range of compositions. It has not been established however, that by controlling specific synthesis variables, it is possible to make faujasites at the same Si/Al ratio with differing distributions of Al atoms in the framework. The present invention discloses specific methods to do this. The present invention establishes that the $Na_2O/SiO_2$ ratio in combination with the $H_2O/Na_2O$ ratio in these preparations can control this effect, as is demonstrated in the following examples. In general we find that when the $Na_2O/SiO_2$ is $\geq 1.6$ and the $H_2O/Na_2O$ is $\geq 37$, Type 2 hettotypes of faujasite are formed. These are characterized by having more Si(0Al) species than Si(1Al) in the structure. It is possible to measure this using solid state NMR spectroscopy. Milton discloses in U.S. Pat. No. 2,882,244, that to prepare zeolite X with a Si/Al ratio of about 1.25 that the ratios of the sodium aluminosilicate gel should fall into the following ranges: $Na_2O/SiO_2$ is between 1.2 and 1.5, the $SiO_2/Al_2O_3$ ratio is between 3.0 and 5.0, and that the $H_2O/Na_2O$ ratio is between 35 and 60. We demonstrate below that using this composition gives a Type 1 hettotype of faujasite, where the number of Si(0Al) species is less than the number of Si(1Al) species. The examples clearly show that $Na_2O/SiO_2$ ratios of at least 1.6 in combination with $H_2O/Na_2O$ ratios of at least 37 lead to the Al distribution described as a Type 2 hettotype. Our findings also indicate that when exchanged into the Li form, these Type 2 hettotypes display superior adsorption properties than Type 1 hettotypes at the same Si/Al ratio and Li content.

EXAMPLE 1

Si/Al=1.16

Type 1

A gel having the composition 4.3 $Na_2O:Al_2O_3:3$ $SiO_2:125$ $H_2O$ was prepared. (The ratio of $Na_2O : SiO_2$ was 1.43, and the ratio of $H_2O:Na_2O$ was 29.1.) A sodium aluminate solution (19.7% $Na_2O$, 23.4% $Al_2O_3$) was added to 242.5 g deionized water. To this 25.53 g 97% NaOH was added. When all the NaOH had dissolved, 92.59 g of a sodium silicate (8.95% $Na_2O$, 32.5% $SiO_2$) solution was added. The addition of the silicate solution resulted in a gel, which was briefly homogenized. The gel was placed into a 100° C. forced draft oven and crystallized for about 41.5 hours. At that time a clear aqueous phase was present with a white solid. The solid was recovered by vacuum filtration and washed with deionized water. When the solid was air dry, an X-ray diffraction pattern was taken. This showed a pattern consistent with the faujasite structure. A trace amount of zeolite A was also present. A $^{29}Si$ NMR spectrum was obtained. The results are listed in Table 4. In this case, the peak area associated with Si tetrahedral atoms having no Al next nearest neighbors [Si(0Al)] was less than the peak area associated with Si tetrahedral atoms having 1 Al next nearest neighbor [Si(1Al)]. This is a Type 1 hettotype of faujasite.

EXAMPLE 2

Si/Al=1.16

Type 2

A gel having the composition 5.6 $Na_2O:Al_2O_3:3$ $SiO_2:2150$ $H_2O$ was prepared. (The ratio of $Na_2O:SiO_2$ was 1.87, and the ratio of $H_2O:Na_2O$ was 38.4.) Into 170.0 g deionized water, 9.43 g solid sodium aluminate (54.08% $Al_2O_3$, 41.66% $Na_2O$) and 13.96 g 97% sodium hydroxide were dissolved. A clear solution was formed with gentle mixing. To this clear solution, 34.25 g sodium silicate. solution (8.71% $Na_2O$, 26.3% $SiO_2$) was added. After a few seconds a gel was formed. The mixture was homogenized and placed into a 100° C. forced draft oven. This mixture was crystallized for 24 hours. At that time a clear aqueous phase was present above a white solid. The solid was recovered by vacuum filtration and washed with deionized water. An X-ray diffraction pattern was recorded for the air dried sample. It was consistent with the faujasite structure. A $^{29}Si$ NMR spectrum was obtained. The results are listed in Table 4. In this case, the peak area associated with Si tetrahedral atoms having no Al next nearest neighbors [Si(0Al)] was greater than the peak area associated with Si tetrahedral atoms having 1 Al next nearest neighbor [Si(1Al)]. This is a Type 2 hettotype of faujasite.

TABLE 4

Summary of NMR peak areas for Si/Al = 1.16 faujasites

| Example | Si/Al | Si(4Al) | Si(3Al) | Si(2Al) | Si(1Al) | Si(0Al) | Type |
|---|---|---|---|---|---|---|---|
| 1 | 1.16 | 65.05 | 21.28 | 8.19 | 2.88 | 2.61 | 1 |
| 2 | 1.16 | 69.36 | 16.31 | 8.63 | 1.53 | 4.17 | 2 |

EXAMPLE 3

Si/Al=1.20

Type 1

A gel having the composition 3.9 $Na_2O:Al_2O_3:3\ SiO_2:125\ H_2O$ was prepared. (The ratio of $Na_2O:SiO_2$ was 1.3, and the ratio of $H_2O:Na_2O$ was 32.1.) A mixture of 65.98 g of a sodium aluminate solution (20.7% $Na_2O$, 22.3% $Al_2O_3$), 20.60 g 97% NaOH and 243.5 g deionized water was prepared. When all the NaOH had dissolved, 92.59 g of a sodium silicate solution (32.5% $SiO_2$, 8.95% $Na_2O$) was added. The addition of the silicate solution resulted in a gel, which was briefly homogenized. The gel was placed into a 100° C. forced draft oven and crystallized for about 90.5 hours. At that time a clear aqueous phase was present with a white solid. The solid was recovered by vacuum filtration and washed with deionized water. When the solid was air dry, an X-ray diffraction pattern was taken. This showed a pattern consistent with the faujasite structure. A $^{29}Si$ NMR spectrum was obtained. The results are listed in Table 5. In this case, the peak area associated with Si tetrahedral atoms having no Al next nearest neighbors [Si(0Al)] was less than the peak area associated with Si tetrahedral atoms having 1 Al next nearest neighbor [Si(1Al)]. This is a Type 1 hettotype of faujasite.

EXAMPLE 4

Si/Al=1.20

Type 2

A gel having the composition 9.55 $Na_2O:Al_2O_3:4\ SiO_2:412\ H_2O$ was prepared. (The ratio of $Na_2O:SiO_2$ was 2.39, and the ratio of $H_2O:Na_2O$ was 43.1) Dissolved 64.49 g solid sodium silicate ($Na_2SiO_3.5\ H_2O$) in 210.6 g $H_2O$. A second solution was prepared by dissolving 32.55 g 97% sodium hydroxide and 14.33 g solid sodium aluminate (54.08% $Al_2O_3$, 41.66% $Na_2O$) in 210.6 g deionized water. A clear solution was formed with gentle mixing. Addition of the aluminate to the silicate solution resulted in a white gel. The mixture was homogenized and placed into a 100° C. forced draft oven. This mixture was crystallized for about 20.5 hours. At that time a clear aqueous phase was present above a white solid. The solid was recovered by vacuum filtration and washed with deionized water. An X-ray diffraction pattern was recorded for the air dried sample. It was consistent with the faujasite structure. A $^{29}Si$ NMR spectrum was obtained. The results are listed in Table 5. In this case, the peak area associated with Si tetrahedral atoms having no Al next nearest neighbors [Si(0Al)] was greater than the peak area associated with Si tetrahedral atoms having 1 Al next nearest neighbor [Si(1Al)]. This is a Type 2 hettotype of faujasite.

TABLE 5

Summary of NMR peak areas for Si/Al = 1.20 faujasites

| Example | Si/Al | Si(4Al) | Si(3Al) | Si(2Al) | Si(1Al) | Si(0Al) | Type |
|---|---|---|---|---|---|---|---|
| 3 | 1.20 | 54.90 | 21.51 | 8.38 | 5.02 | 2.20 | 1 |
| 4 | 1.20 | 61.09 | 21.46 | 10.81 | 2.07 | 4.57 | 2 |

EXAMPLE 5

Si/Al=1.25

Type 1

A typical X type material is that described by Milton in U.S. Pat. No. 2,882,244. A commercially obtained 13X material has the $^{29}Si$ NMR spectrum listed in Table 6. In this case, the peak area associated with Si tetrahedral atoms having no Al next nearest neighbors [Si(0Al)] was less than the peak area associated with Si tetrahedral atoms having 1 Al next nearest neighbor [Si(1Al)]. This is a Type 1 hettotype of faujasite.

EXAMPLE 6

Si/Al=1.25

Type 2

A gel having the composition 7.20 $Na_2O:Al_2O_3:3\ SiO_2:411.5\ H_2O$ was prepared. (The ratio of $Na_2O:SiO_2$ was 2.4, and the ratio of $H_2O:Na_2O$ was 57.2.) Dissolved 309.74 g solid sodium silicate ($Na_2SiO_3.5\ H_2O$) in 1372.8 g $H_2O$. Prepared a second solution by dissolving 117.11 g 97% sodium hydroxide, and 91.66 g solid sodium aluminate (54.08% $Al_2O_3$, 41.66% $Na_2O$) in 210.6 g deionized water. A clear solution was formed with gentle mixing. Added the aluminate to the silicate solution. To this mixture 835.0 g of deionized water was then added. After a few seconds a gel was formed. The mixture was homogenized and placed into a 100° C. forced draft oven. This mixture was crystallized for about 75 hours. At that time a clear aqueous phase was present above a white solid. The solid was recovered by vacuum filtration and washed with deionized water. An X-ray diffraction pattern was recorded for the air dried sample. It was consistent with the faujasite structure. A $^{29}Si$ NMR spectrum was obtained. The results are listed in Table 6. In this case, the peak area associated with Si tetrahedral atoms having no Al next nearest neighbors [Si(0Al)] was greater than the peak area associated with Si tetrahedral atoms having 1 Al next nearest neighbor [Si(1Al)]. This is a Type 2 hettotype of faujasite.

TABLE 6

Summary of NMR peak areas for Si/Al = 1.25 faujasites

| Example | Si/Al | Si(4Al) | Si(3Al) | Si(2Al) | Si(1Al) | Si(0Al) | Type |
|---|---|---|---|---|---|---|---|
| 5 | 1.25 | 48.95 | 25.35 | 13.87 | 4.82 | 1.24 | 1 |
| 6 | 1.25 | 54.89 | 26.49 | 8.98 | 2.29 | 7.35 | 2 |

EXAMPLE 7

Si/Al=1.14

Type 1

A gel having the composition 5.60 $Na_2O:Al_2O_3:3.0\ SiO_2:200\ H_2O$ was prepared. (The ratio of $Na_2O/SiO_2$=1.87 and H$_2$O/Na$_2$O=35.7). A mixture of 19.10 g 97% NaOH, 155.6 g H$_2$O and 82.47 g sodium aluminate solution (22.3% Al$_2$O$_3$ and 20.7% Na$_2$O) was prepared. When all the NaOH had dissolved, 115.73 g of sodium silicate (32.5% SiO$_2$ and 8.95% Na$_2$O) and 400.2 g of water were added. The addition of the silicate solution resulted in a gel, which was homogenized. The gel was placed into a 100° C. forced draft and crystallized for about 40 hours. At that time a clear aqueous phase was present with a white solid. The solid was recovered by vacuum filtration, and washed with deionized water. When the solid was air dry, an X-ray diffraction pattern was taken. This showed a pattern consistent with the faujasite structure. A $_{29}$Si NMR spectrum was obtained, shown in FIG. 1A. The results are listed in Table 7. In this case, the peak area associated with Si tetrahedral atoms having no Al next nearest neighbors [Si(0Al)] was less than the peak area associated with Si tetrahedral atoms having 1 Al next nearest neighbor [Si(1Al)]. This is a Type 1 hettotype of faujasite.

To prepare the Li form for adsorption testing, 13.0 g of the Na form was slurried with 325cc of 2M LiCl. The pH of 2M LiCl solution was adjusted to about 8 using a LiOH solution. This was done to prevent H$^+$ exchange into the zeolite. The slurry was placed in a 100° C. forced draft oven, and left overnight. The solid was recovered from the solution by vacuum filtration, and was washed with wash water adjusted to a pH of about 8 with LiOH. The entire Li ion exchange procedure was repeated for a total of 5 contacts of the zeolite with fresh Li solution. Elemental analysis showed that less than 0.5% of the cation content was Na, and only Na and Li were present.

In order to evaluate the effectiveness of this adsorbent for a gas separation, a sample was pressed into pellets (with no binder). This was accomplished using a hydraulic press in a 1" dye. About 1–1.25 g of the powder was placed into the dye and compressed to about 4–6 tons. Approximately 8 pellets were prepared in such a way, and each was broken into no more than thirds. Each of the pieces was placed into a quartz tube for activation. This was done under dynamic vacuum, with a heating rate of ~1° C./min, with 1 hour holds at 100°, 200°, 250°, and 300° C. A final temperature of 350° C. was maintained for about 8 hours. After cooling to room temperature, the sample was loaded into a cell in an Ar atmosphere dry box. The cell was placed in the binary adsorption unit previously described and the N$_2$ selectivity from an air mixture was measured at different temperatures. The N$_2$/O$_2$ selectivity verses temperature are shown in FIG. 2 for the curve marked Type 1.

EXAMPLE 8

Si/Al=1.14

Type 2

A gel having the composition 6.33 Na$_2$O:Al$_2$O$_3$:3.0 SiO$_2$:275 H$_2$O was prepared. (The ratio of Na$_2$O:SiO$_2$ was 2.11, and the ratio of H2O:Na$_2$O was 43.4.) A mixture of 14.23 g solid sodium aluminate (54.08% Al$_2$O$_3$, 41.66% Na$_2$O), 12.91 g 97% NaOH, and 175.5 g H$_2$O was prepared. When all the NaOH had dissolved, a mixture of 48.77 g Na$_2$SiO$_3$.5H$_2$O and 175 g H$_2$O was added. The addition of the silicate solution resulted in a gel, which was briefly homogenized. The gel was placed into a 100° C. forced draft oven and crystallized for about 24 hours. At that time a clear aqueous phase was present with a white solid. The solid was recovered by vacuum filtration, and washed with deionized water. When the solid was air dry, an X-ray diffraction pattern was taken. This showed a pattern consistent with the faujasite structure. A $^{29}$Si NMR spectrum was obtained, shown in FIG. 1B. The results are listed in Table 7. In this case, the peak area associated with Si tetrahedral atoms having no Al next nearest neighbors [Si(0Al)] was greater than the peak area associated with Si tetrahedral atoms having 1 Al next nearest neighbor [Si(1Al)]. This is a Type 2 hettotype of faujasite.

The Li form of this adsorbent was prepared in the same manner as that of Example 7. Elemental analysis showed that less than 0.5% of the cation content was Na, and only Na and Li were present.

Pellets were prepared, broken and activated in the same manner as described in Example 7. The N$_2$ selectivity using the same experimental conditions as for Example 7 was determined. The results verses temperature are shown in FIG. 2, the curve marked Type 2. Comparison of the selectivity values for Type 1 and Type 2 hettotypes of faujasite clearly shows the higher selectivity possible using the Type 2 hettotype of faujasite.

TABLE 7

Summary of NMR peak areas for Si/Al = 1.13 faujasites

| Example | Si/Al | Si(4Al) | Si(3Al) | Si(2Al) | Si(1Al) | Si(0Al) | Type |
|---|---|---|---|---|---|---|---|
| 7 | 1.14 | 69.95 | 17.48 | 7.33 | 4.41 | 0.83 | 1 |
| 8 | 1.14 | 74.0 | 18.54 | 2.85 | 1.54 | 3.07 | 2 |

The materials of the present invention exhibit higher than expected gas capacity for strongly adsorbed components such as N$_2$, based on the corresponding high number of cations in the supercages (which is directly related to the presence of Al enriched and Al deficient regions in the structure). This result may be due to changes in cation location, following the non-uniform Al distribution. Less strongly adsorbed components such as O$_2$ appear to be less affected since adsorption of these molecules is not dominated by the cations present in the solid. This results in increases in selectivity relative to conventional X-zeolite adsorbents with uniform Al and cation distributions. This is dramatically demonstrated in FIG. 2 where a prior art lithium exchanged Type 1 aluminosilicate X-type zeolite with a Si/Al ratio of 1.14, described in Example 7 above and a present invention lithium exchanged Type 2 aluminosilicate of faujasite structure with a Si/Al ratio of 1.14 described in Example 8 above were measured for binary selectivity at 1 atmosphere in an air-like gas mixture (21.5% oxygen, remainder nitrogen) at temperatures varying from −10° to 450° C. The Type 2 faujasite of the present invention showed considerable enhanced selectivity performance over the comparable Type 1 faujasite of the prior art. This selectivity is critical to the economic performance of commercial air separation equipment for purity, recovery and capital costs.

The present invention provides superior adsorbents for binary gas mixture resolutions such as air separations. The unique synthesis techniques used to produce these Type 2 hettotype adsorbents provides a ready method for producing a non-uniform Al distribution throughout the entire zeolite crystal. This allows for high performance adsorbents without the increased cost of greater lithium cation exchange to achieve that performance.

Typically, the zeolites of the present invention are synthesized in the sodium cation form. For air separation utility, it is desirable to cation exchange the zeolite with lithium cations, preferably to at least 80% of the available exchangeable cations, more preferably 85%. The cation exchange can be a binary or tertiary exchange of cations resulting in mixtures of lithium and other monovalent, bivalent or trivalent cations, such as: cobalt, copper, chromium, iron, manganese, nickel, zinc, calcium, strontium, magnesium, barium, aluminum, cerium, scandium, gallium, indium, yttrium, lanthanum and mixed lanthanides. In the case of a binary exchange of the zeolite with lithium and another cation, the cation content is preferably, 50 to 95% lithium and 5 to 50% of a second cation, more preferably, 70 to 90% lithium and 30 to 10% of a second cation.

The zeolites of the present invention can be used with any of the typical adsorptive air separation processes currently in use, which generally use switching parallel-connected beds of adsorbent wherein the steps of adsorption at elevated pressure, depressurization, evacuation, repressurization occur with or without additional steps of pressure equalization, countercurrent purge, and repressurization with feed, product and various combinations of feed and product. The air separation can be conducted at −100° C. to 100° C., preferably, 0° C. to 50° C.

The present invention has been set forth with regard to several preferred embodiments, however the full scope of the present invention should be ascertained from the claims which follow.

We claim:

1. An aluminosilicate zeolite composition having the faujasite structure with a Si/Al ratio in the range of approximately 1.05 to 1.26 and where the number of silicon atoms with four next nearest neighbor silicon atoms is greater than the number of silicon atoms with three next nearest neighbor silicon atoms and one next nearest neighbor aluminum atom and there are β-cages which contain 12 aluminum atoms and there are β-cages which contain 10 or less aluminum atoms in said zeolite.

2. The composition of claim 1 wherein the $^{29}$Si nuclear magnetic resonance spectrum of said zeolite has a Si(0Al) peak of greater area than its Si(1Al) peak.

3. The composition of claim 1 wherein said Si/Al ratio is approximately 1.15 to 1.20.

4. The composition of claim 1 wherein said zeolite is cation exchanged with lithium.

5. The composition of claim 4 wherein said lithium is exchanged to replace at least 80% of exchangeable cations in said zeolite.

6. A process of synthesizing an aluminosilicate zeolite having a faujasite structure with a Si/Al ratio in the range of approximately 1.05 to 1.26, where the number of silicon atoms with four next nearest neighbor silicon atoms is greater than the number of silicon atoms with three next nearest neighbor silicon atoms and one next nearest neighbor aluminum atom and there are β-cages which contain 12 aluminum atoms and there are β-cages which contain 10 or less aluminum atoms in said zeolite, comprising crystallizing said zeolite from a mixture of alkali metal aluminate and alkali metal silicate, wherein said mixture has an alkali metal oxide to silica ratio of at least 1.6 and a water to alkali metal oxide ratio of at least 37.

7. The process of claim 6 wherein said alkali metal aluminate is sodium aluminate.

8. The process of claim 6 wherein said alkali metal silicate is sodium silicate.

9. The process of claim 6 wherein said zeolite is cation exchanged with lithium cations to replace at least 80% of the exchangeable cations in said zeolite.

10. A process of synthesizing an aluminosilicate zeolite having a faujasite structure with a Si/Al ratio in the range of approximately 1.05 to 1.26, where the number of silicon atoms with four next nearest neighbor silicon atoms is greater than the number of silicon atoms with three next nearest neighbor silicon atoms and one next nearest neighbor aluminum atom and there are β-cages which contain 12 aluminum atoms and there are β-cages which contain 10 or less aluminum atoms in said zeolite, comprising mixing an aqueous solution of sodium aluminate and an aqueous solution of sodium meta-silicate in a ratio of 1:3 to 1:10 in an aqueous medium wherein the resulting mixture has an alkali metal oxide to silica ratio of at least 1.6 and a water to alkali metal oxide ratio of at least 37 and crystallizing said mixture at elevated temperature and recovering said zeolite.

* * * * *